US009600051B2

(12) United States Patent
Park (10) Patent No.: US 9,600,051 B2
(45) Date of Patent: Mar. 21, 2017

(54) DISPLAY APPARATUS AND CONTROL METHOD THEREOF

(71) Applicant: SAMSUNG ELECTRONICS CO., LTD., Suwon-si (KR)

(72) Inventor: Sang-hyurk Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 156 days.

(21) Appl. No.: 14/566,795

(22) Filed: Dec. 11, 2014

(65) Prior Publication Data

US 2015/0253834 A1 Sep. 10, 2015

(30) Foreign Application Priority Data

Mar. 6, 2014 (KR) .................. 10-2014-0026336

(51) Int. Cl.
*G09G 5/00* (2006.01)
*G06F 1/32* (2006.01)
*G06F 9/44* (2006.01)

(52) U.S. Cl.
CPC .......... *G06F 1/3206* (2013.01); *G06F 9/4401* (2013.01); *G09G 5/00* (2013.01); *G09G 5/003* (2013.01); *G09G 2320/0247* (2013.01); *G09G 2330/021* (2013.01); *G09G 2330/026* (2013.01); *G09G 2330/027* (2013.01)

(58) Field of Classification Search
CPC .. G09G 3/36; G09G 5/00; G09G 5/10; G09G 5/02; G09G 3/30; G09G 3/10; G06F 3/038
See application file for complete search history.

(56) References Cited

U.S. PATENT DOCUMENTS

| | | | | |
|---|---|---|---|---|
| 6,684,338 B1* | 1/2004 | Koo | ............... | G06F 1/1616 713/300 |
| 2001/0029178 A1* | 10/2001 | Criss | ............... | G06F 8/65 455/419 |
| 2005/0078106 A1* | 4/2005 | Greenwood | ............... | G06F 1/26 345/211 |
| 2006/0224875 A1 | 10/2006 | Choi et al. | | |
| 2009/0172439 A1 | 7/2009 | Cooper et al. | | |

(Continued)

FOREIGN PATENT DOCUMENTS

| | | |
|---|---|---|
| JP | 201139199 A | 2/2011 |
| KR | 1020060097585 A | 9/2006 |
| KR | 1020060113200 A | 11/2006 |
| KR | 1020130116599 A | 10/2013 |

OTHER PUBLICATIONS

Search Report dated May 19, 2015, issued by the International Searching Authority in counterpart International Application No. PCT/KR2015/002034.

(Continued)

*Primary Examiner* — Pegeman Karimi
(74) *Attorney, Agent, or Firm* — Sughrue Mion, PLLC (57) ABSTRACT

A control method of a display apparatus includes displaying image content, in response to a power-off command being input, determining whether the display apparatus operates in an instant-on mode, and in response to determining that the display apparatus operates in the instant-on mode, storing information regarding image content displayed when the power-off command is input, and outputting an indicator that indicates the instant-on mode.

15 Claims, 9 Drawing Sheets

(56) References Cited

U.S. PATENT DOCUMENTS

| | | | |
|---|---|---|---|
| 2010/0293361 A1 | 11/2010 | Shibata | |
| 2012/0096256 A1* | 4/2012 | Kim | G06F 9/4418 713/2 |
| 2013/0247156 A1* | 9/2013 | Savo | G06F 21/31 726/4 |
| 2013/0275739 A1 | 10/2013 | Kim et al. | |
| 2014/0245040 A1* | 8/2014 | Baram | G06F 1/3275 713/323 |

OTHER PUBLICATIONS

Written Opinion dated May 19, 2015, issued by the International Searching Authority in counterpart International Application No. PCT/KR2015/002034.
Search Report dated Jul. 7, 2015, issued by the European Patent Office in counterpart European Application No. 15151223.3.
Exam Report dated Aug. 4, 2015, issued by the European Patent Office in counterpart European Application No. 15151223.3.
Georg Schnurer; "Alles Unter Kontrolle—Power Management und PC-Konfiguration neu spezifiziert", c't 20/1998, Sep. 24, 1998, Total 13 pages, XP 055198671, URL: http://www.heise.de/artikel-archiv/ct/1998/20/166/@00350@/art.htm.
Harald Bogeholz; "Jack-in-the-box—Neues Power Management in Window 98", c't 15/1999, Jul. 16, 1999, Total 9 pages, XP 055198668, URL: http://www.heise.de/artikel-archiv/ct/1999/15/096/@00250@/art.htm.
Communication dated Sep. 5, 2016 issued by the European Patent Office in counterpart European Patent Application No. 15151223.3.

\* cited by examiner

DISPLAY APPARATUS AND CONTROL METHOD THEREOF

CROSS-REFERENCE TO RELATED APPLICATIONS

This application claims priority from Korean Patent Application No. 10-2014-0026336, filed on Mar. 6, 2014, in the Korean Intellectual Property Office, the disclosure of which is incorporated herein by reference in its entirety.

BACKGROUND

Field

Apparatuses and methods consistent with one or more exemplary embodiments relate to a display apparatus and a control method thereof, and more particularly, to a display apparatus which enables a user to easily identify a booting mode of the display apparatus, and a control method thereof.

Description of the Related Art

Diverse technologies to boot up a display apparatus quickly have increased recently.

General booting is booting in which when a normal operating system boots up and is running, a system is turned off and is turned on again to operate diverse application programs.

Meanwhile, recent electronic devices may use diverse types of booting modes such as suspend to RAM mode and instant-on mode for transition to an initialized state to instantly perform a function of the system in a few seconds after the system is turned on.

The instant-on function for quick booting increases a booting speed of the electronic device system, but when a user command is input to turn on the system, it directly displays content which is being displayed when a user command was input to turn off the system.

When an event such as when a user who inputs a power-off command is different from a user who inputs a turn-on command again after power-off, and when the general booting mode is desired due to change in an external environment, occurs, the user cannot know whether the electronic device boots up in the instant-on mode or the general booting mode, and cannot control the booting mode.

SUMMARY

Exemplary embodiments overcome the above disadvantages and other disadvantages not described above. Also, exemplary embodiments are not required to overcome the disadvantages described above, and an exemplary embodiment may not overcome any of the problems described above.

One or more exemplary embodiments provide a display apparatus which enables the user to recognize and control a booting mode of the display apparatus, and a control method thereof.

According to an aspect of one or more exemplary embodiments, a control method of a display apparatus includes displaying image content, in response to a power-off command being input, determining whether the display apparatus operates in an instant-on mode, and in response to the determining that the display apparatus operates in the instant-on mode, storing information regarding image content displayed when the power-off command is input, and outputting an indicator that indicates the instant-on mode.

The outputting the indicator may include differing an output method of a light emitting diode (LED) attached to an exterior of the display apparatus in the instant-on mode from the output method of the LED in a non-instant-on mode.

The differing the output method of the LED in the instant-on mode from the output method of the LED in the non-instant-on mode may include differing at least one of a color of the LED, whether the LED flickers, a number of flickering times of the LED, and a luminous period of the LED.

The method may further include determining whether a predetermined event occurs after the display apparatus is turned off in the instant-on mode, and in response to the predetermined event occurring, turning off the instant-on mode and changing an output of the indicator.

The predetermined event may include a selection of a predetermined button on a control apparatus that is coupled with the display apparatus.

The method may further include in response to a first user command being input to turn on the display apparatus while the indicator indicates that the display apparatus operated in the instant-on mode in the power-off state, displaying image content corresponding to the stored information regarding the image content, or in response to a second user command is input to turn on the display apparatus, displaying a pre-stored predetermined screen of the display apparatus.

The first user command may be a user command of pressing a power button of a control apparatus that is coupled with the display apparatus within a predetermined period of time, and the second user command may be a user command of pressing the power button after the predetermined period of time.

The determining may include determining that the display apparatus does not operates in the instant-on mode in response to the display apparatus being unplugged, in response to the display apparatus being turned off in response to a software update, in response to the power-off command being input after the display apparatus is turned on during more than a predetermined period of time, or in response to the display apparatus being turned off before finishing an automatic channel search.

According to another aspect of one or more exemplary embodiments, a display apparatus includes a display configured to display image content, a user inputter, a storage, and a controller configured to determine whether the display apparatus operates in instant-on mode in response to a power-off command being input through the user inputter, control the storage to store information regarding image content being displayed in response to determining that the display apparatus operates in the instant-on mode when the power-off command is input, and control an indicator to indicate that display apparatus operates in the instant-on mode when the display apparatus operates in the instant-on mode.

The controller may control an output method of a light emitting diode (LED) attached to an exterior of the display apparatus in the instant-on mode to be different from the output method of the LED in a non-instant-on mode.

The output method of the LED may be different in the instant-on mode from the output method of the LED in the non-instant-on mode based on at least one of a color of the LED, whether the LED flickers, a number of flickering times of the LED, a flickering pattern of the LED, and a luminous period of the LED.

The controller may include a sub controller, and the sub controller may determine whether a predetermined event occurs after the display apparatus is turned off in the instant-on mode, and in response to the predetermined event being determined to have occurred, the sub controller may turn off the instant-on mode and change an output of the indicator.

The predetermined event may include a selection of a predetermined button on a control apparatus coupled with the display apparatus.

In response to a first user command being input to turn on the display apparatus while the indicator indicates that the display apparatus operates in the instant-on mode, the controller may control the display to display image content corresponding to the stored information regarding the image content, and in response to a second user command being input to turn on the display apparatus, the controller may control the display to display a pre-stored predetermined screen of the display apparatus.

The first user command may be a user command of pressing a power button of a control apparatus that is coupled with the display apparatus within a predetermined period of time, and the second user command may be a user command of pressing the power button after the predetermined period of time.

The controller may determine that the display apparatus does not operate in the instant-on mode in response to the display apparatus being unplugged, in response to the display apparatus being turned off in response to software updates, in response to the power-off command being input after the display apparatus is turned on after a predetermined period of time, or in response to the display apparatus being turned off before finishing an automatic channel search.

According to one or more exemplary embodiments, a method of controlling a power-on mode of a display apparatus, includes: in response to receiving a power-off command, determining whether the display apparatus operates in an instant-on mode; in response to the determining that the display apparatus operates in the instant-on mode, storing information regarding image content displayed when the power-off command is received, and indicating that the display apparatus operates in an instant-on mode.

The method may further include: while the display apparatus operates in the instant-on mode, in response to receiving a first user command, displaying image content corresponding to the stored information regarding the image content, and, in response to receiving a second user command, displaying a predetermined screen of the display apparatus.

The method may further include: controlling the display apparatus to be in a non-instant-on mode in response to a predetermined event; and in response to the predetermined event, indicating that the display device operates in the non-instant-on mode. The predetermined event may be a user input.

According to one or more exemplary embodiments, the user may recognize and control booting mode of the display apparatus.

Additional and/or other aspects and advantages of the invention will be set forth in part in the description which follows and, in part, will be obvious from the description, or may be learned by practice of the invention.

BRIEF DESCRIPTION OF THE DRAWING FIGURES

The above and/or other aspects will be more apparent by describing certain exemplary embodiments with reference to the accompanying drawings, in which.

DETAILED DESCRIPTION OF EXEMPLARY EMBODIMENTS

Certain exemplary embodiments will now be described in greater detail with reference to the accompanying drawings.

In the following description, same drawing reference numerals are used for the same elements even in different drawings. The matters defined in the description, such as detailed construction and elements, are provided to assist in a comprehensive understanding of the invention. Thus, it is apparent that exemplary embodiments can be carried out without those specifically defined matters. Also, well-known functions or constructions are not described in detail since they would obscure the invention with unnecessary detail.

Figure 1:
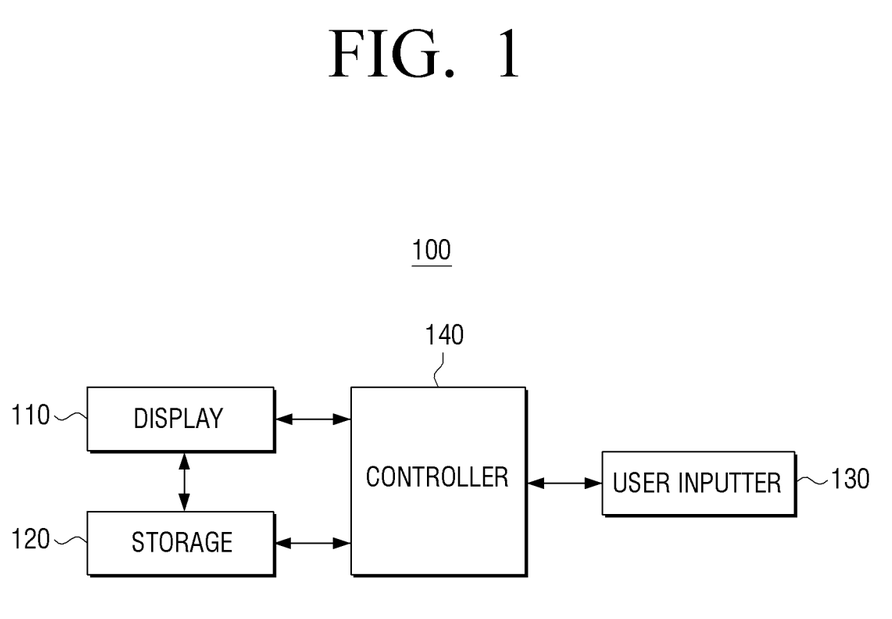
FIG. 1 is a simple block diagram of a configuration of a display apparatus according to an exemplary embodiment.

FIG. 1 is a simple block diagram of a configuration of a display apparatus 100 according to an exemplary embodiment. With reference to FIG. 1, the display apparatus 100 may include a display 110, a storage 120, a user inputter 130, and a controller 140. The display apparatus 100 may be a television (TV), but this is merely an exemplary embodiment. The display apparatus 100 may be implemented with diverse types of electronic devices having a display, such as a mobile phone, a tablet PC, a digital camera, a camcorder, a notebook PC, a personal digital assistant (PDA), and the like.

The display 110 displays an image. The display 110 may display content received via a broadcast channel. That is, the display 110 may receive diverse types of broadcast signals from a broadcasting station via a radio frequency (RF) communication network or receive content from diverse types of servers via an internet protocol (IP) network, and display the received content.

The storage 120 stores diverse modules to drive the display apparatus 100. For example, the storage 120 may store software including a base module, a sensing module, a communication module, a presentation module, a web browser module, and a service module. The base module is a basic module that processes a signal transmitted from each hardware included in the display apparatus 100 and transmits the signal to an upper layer module. The sensing module is a module that collects information from diverse sensors and analyzes and manages the collected information, including a face recognition module, a speech recognition module, a motion recognition module, a near field communication (NFC) recognition module, and so on. The presentation module is a module that composes a display screen, including a multimedia module to play back and output multimedia content and a user interface (UI) rendering module to process a UI and graphics. The service module is a module including diverse applications to provide diverse services.

The storage 120 may include diverse program modules as described above, but may exclude or change some of them or add others according to the kind and characteristic of the display apparatus 100. For example, when the display apparatus 100 is a smart phone, the base module may further include a position determination module to determine a position based on global positioning system (GPS), and the sensing module may further include a sensing module to sense a gesture of the user.

When the display apparatus 100 operates in instant-on mode, the storage 120 may store information regarding image content being displayed when a power-off command is input to turn off the display apparatus 100.

The instant-on mode is a mode to perform instant booting when a user command is input to turn on the display apparatus 100. That is, the instant booting indicates transition to an initialized state to instantly perform a function of the system within a few seconds after the system is turned on.

Accordingly, when the display apparatus 100 is turned off in the instant-on mode and when a user command is input to turn on the display apparatus 100, the display apparatus 100 may display a screen being displayed when the display apparatus 100 was turned off.

In other words, when the display apparatus 100 is turned off, the display apparatus 100 may store a state of a hardware drive in the storage 120 such as a dynamic random access memory (DRAM) so that standby mode such as suspend to RAM and suspend to disk or instant-on mode may run. Accordingly, in the suspend state, the display apparatus 100 may restore content stored in the storage 120 such as a DRAM using self-refresh operation of a double data rate (DDR) memory of the storage 120. When a user command is input to turn on the display apparatus 100, the display apparatus 100 may be instantly restored to the operation state prior to power-off.

The user inputter 130 receives a user command. The user inputter 130 receives a user command to control overall operation of the display apparatus 100. In particular, the user inputter 130 may receive a user command to turn on or off the display apparatus 100.

In this case, the user inputter 130 may be implemented with a remote control including four direction keys such as up, down, right and left keys, and a confirmation key, but this is merely an exemplary embodiment. The user inputter 130 may be implemented with diverse input devices such as a touch screen, a mouse, a pointing device, and the like.

The controller 140 controls overall operation of the display apparatus 100. In particular, when a power-off command is input to turn off the display apparatus 100 through the user inputter 130, the controller 140 may determine whether the display apparatus 100 operates in the instant-on mode.

When the display apparatus 100 operates in the instant-on mode, the controller 140 may control the storage 120 to store information regarding image content being displayed when the power-off command is input. In addition, the controller 140 may control an indicator to indicate the instant-on mode.

The controller 140 may control an output method of a light emitting diode (LED) (not shown) as the indicator that indicates the instant-on mode. In other words, the controller 140 may control an output method of the LED attached to the exterior of the display apparatus 100 so that an output method of the LED in the instant-on mode may be different from that in non-instant-on mode.

As non-limiting examples, the controller 140 may control an output method of the LED using at least one of a color of the LED, whether the LED flickers, the number of flickering times of the LED, and a luminous period of the LED.

After the display apparatus 100 is turned off in the instant-on mode, the controller 140 may sense whether a predetermined event occurs. In particular, the controller 140 may include a sub controller (not shown) and the sub controller may sense whether a predetermined event occurs after the display apparatus 100 is turned off.

When a predetermined event such as pressing a button on a control apparatus which is coupled with the display apparatus 100 occurs after power-off in the instant-on mode, the sub controller may turn off the instant-on mode and change the output of the indicator.

When a first user command is input to turn on the display apparatus 100 after outputting the indicator indicating that the display apparatus 100 operates in the instant-on mode in the power-off state, the controller 140 may display image content corresponding to the stored image content information.

In addition, when a second user command is input to turn on the display apparatus 100, the controller 140 may control the display 110 to display a predetermined screen of the display apparatus 100 which is pre-stored.

More specifically, the first user command may be a user command of pressing a power button during less than a predetermined period of time, and the second user command may be a user command of pressing the power button during the predetermined period of time or more.

The predetermined screen may be a pre-stored initial screen of the display apparatus 100.

The controller 140 may determine that the display apparatus 100 does not operate in the instant-on mode when the display apparatus 100 gets unplugged and is thus turned off, when the power-off command is input and the display apparatus 100 is turned off after software updates, when the power-off command is input after the display apparatus 100 is turned on during more than a predetermined period of time, or when the display apparatus 100 is turned off before finishing an automatic channel search.

Figure 2:
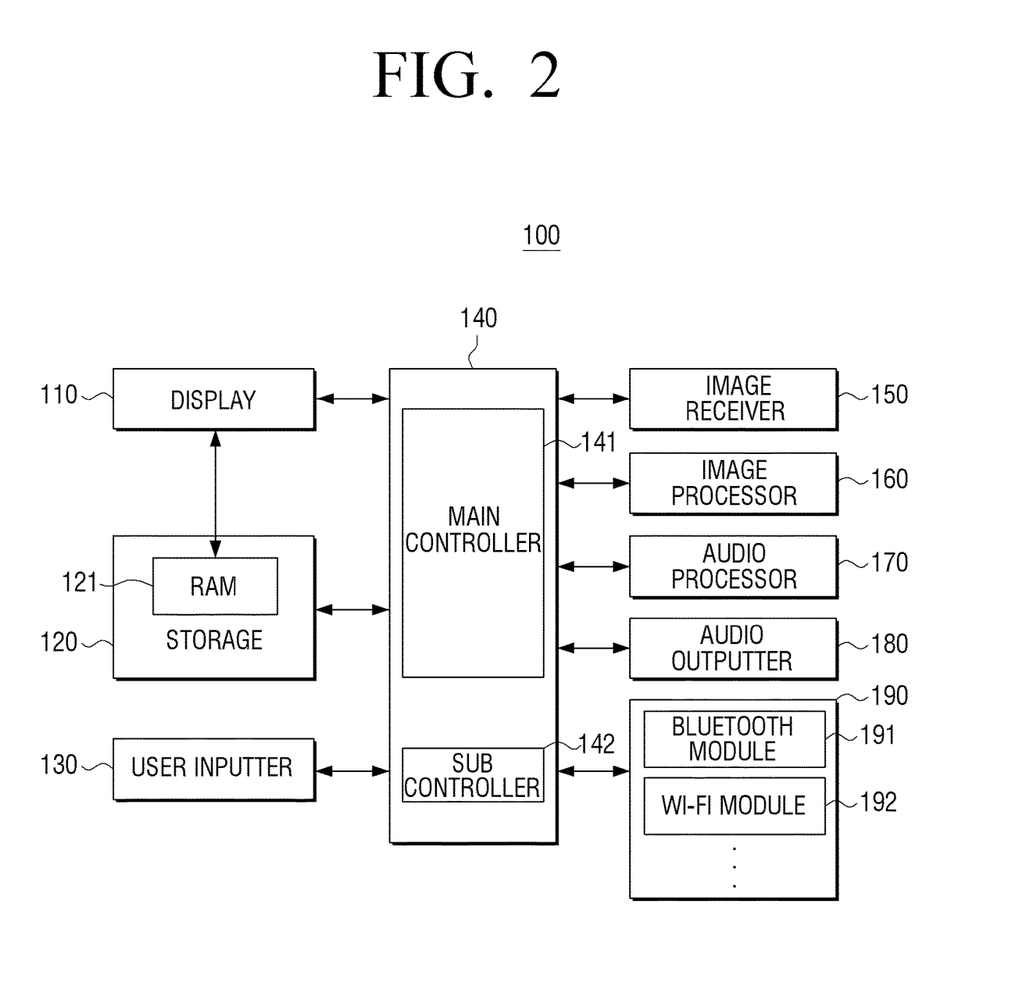
FIG. 2 is a detailed block diagram of a configuration of the display apparatus according to an exemplary embodiment.

The detailed configuration of the display apparatus 100 is described with reference to FIG. 2. FIG. 2 is a detailed block diagram of a configuration of the display apparatus 100 according to an exemplary embodiment. With reference to FIG. 2, the display apparatus may include a display 110, a storage 120, a user inputter 130, a controller 140, an image receiver 150, an image processor 160, an audio processor 170, an audio outputter 180, and a communication module 190.

FIG. 2 illustrates the components of the display apparatus 100 which is for example a device having diverse functions such as an instant-on function, a standby mode function such as suspend to RAM and suspend to disk, a communication function, a video playback function, and a display function. Accordingly, according to exemplary embodiments, some of the components illustrated in FIG. 2 may be omitted or replaced, or others may be added.

The display 110 displays an image. The display 110 may display content received via a broadcast channel. That is, the display 110 may display at least one of a video frame processed by the image processor 160 from image data received by the image receiver 150, and diverse screens generated by a graphic processor (not shown).

In addition, the display 110 may display an operating system driving screen of the display apparatus 100 or an application program screen. That is, the display 110 may display a pre-stored initial screen when the display apparatus 100 is turned on, an execution screen corresponding to a selected application program, and so on.

The storage 120 stores diverse modules to drive the display apparatus 100. In addition, the storage 120 may include a random-access memory (RAM) 121. Accordingly, when the display apparatus 100 operates in the instant-on mode, the storage 120 may store in the RAM 121 information regarding image content being displayed when a power-off command is input to turn off the display apparatus 100.

In other words, when the display apparatus 100 is turned off, the display apparatus 100 may store a state of a hardware drive in the storage 120 such as a dynamic random access memory (DRAM) so that a standby mode such as suspend to RAM and suspend to disk or instant-on mode may run. Accordingly, in the suspend state, the display apparatus 100 may restore content stored in the storage 120 such as a DRAM using self-refresh operation of a double data rate (DDR) memory of the storage 120.

When a user command is input to turn on the display apparatus 100, the display apparatus 100 may be instantly restored to the operation state prior to power-off.

More specifically, when a user power-off command is input to turn on the display apparatus 100, the display apparatus 100 may constitute and display an initial screen using the stored information (for example, a connection URL, channel information, or selection of a selected external device of the image content being displayed when the power-off command was input) regarding the image content being displayed when the power-off command was input. Accordingly, when a user command is input to turn on the display apparatus 100, the display apparatus 100 may display the screen being displayed when the power-off command was input.

The user inputter 130 receives a user command. The user inputter 130 receives a user command to control overall operation of the display apparatus 100. In particular, the user inputter 130 may receive a user command to turn on or off the display apparatus 100.

In this case, the user inputter 130 may be implemented with a remote control including four direction keys such as up, down, right and left keys, and a confirmation key, but this is merely an exemplary embodiment. The user inputter 130 may be implemented with diverse input devices such as a touch screen, a mouse, a pointing device, and an external electronic device such as a mobile phone.

The controller 140 may include a main controller 141 and a sub controller 142.

The main controller 141 controls overall operation of the display apparatus 100. In particular, the main controller 141 may determine whether the display apparatus 100 operates in the instant-on mode. That is, the main controller 141 may determine whether the display apparatus 100 operates in the instant-on mode, and transmit a command regarding the determination result to the sub controller 142.

The main controller 141 may determine that the display apparatus 100 operates in the instant-on mode if an event which is predetermined in initial settings does not occur.

The predetermined event may include when power is not supplied to the display apparatus 100, when the power-off command is input through the user inputter 130 and the display apparatus 100 is turned off after software updates, when the display apparatus 100 is turned on during more than a predetermined period of time, the power-off command is input while the display apparatus 100 is turned off, and when the display apparatus 100 is turned off before finishing an automatic channel search.

That is, the main controller 141 may determine that the display apparatus 100 operates in the instant-on mode if the aforementioned predetermined event does not occur. Accordingly, in the instant-on mode, when a power-off command is input, the display apparatus 100 supplies power to the sub controller 142, a portion of the communication module 190 such as a Bluetooth module, and the RAM 121, and cuts off power supply to the other components of the display apparatus 100.

The sub controller 142 may receive a command to operate in the instant-on mode from the main controller 141, and control an indicator (not shown) accordingly.

When an LED (not shown) attached to the exterior of the display apparatus 100 is used as the indicator, the sub controller 142 may make color of the LED in the instant-on mode different from color of the LED in non-instant-on mode, or may control the LED to glow without flicker in the non-instant-on mode and glow with flicker in the instant-on mode. Alternatively, the sub controller 142 may control the LED to flicker and emit light in both the instant-on mode and the non-instant-on mode but to change a flickering period or pattern of the LED or the number of flickering times according to the modes.

In other words, according to light emission of the LED, the user may know whether the display apparatus 100 can display the screen being displayed when the user turned off the display apparatus 100. In addition, according to light emission of the LED, the user may know whether transition to an initial state to instantly perform a function of the display apparatus 100 using instant booting is possible. In addition, according to light emission of the LED, it is determined whether the display apparatus 100 is in the instant-on mode so that the user may know that valid data for instant booting are stored in a storage such as a RAM.

When any aforementioned predetermined event occurs, the main controller 141 may determine that the display apparatus 100 is not in the instant-on mode. Accordingly, the main controller 141 may transmit the sub controller 142 a command not to operate in the instant-on mode.

The sub controller 142 may receive a command not to operate in the instant-on mode from the main controller 141, and control the indicator accordingly. In addition, the display apparatus 100 may cut off power supply to the components of the display apparatus 100 except for the sub controller 142 and a portion of the communication module 190.

The sub controller 142 may sense an infrared (IR) signal of a control apparatus such as a remote control which is coupled with the display apparatus 100. That is, since the power is supplied to the sub controller 142 regardless of whether the display apparatus 100 is in the instant-on mode, the sub controller 142 may receive an IR signal of the remote control.

Accordingly, after the display apparatus 100 is turned off in the instant-on mode, the sub controller 142 determines whether a predetermined event occurs. When it is determined that the predetermined event occurs, the sub controller 142 may turn off the instant-on mode and change the output of the indicator. The predetermined event may be an event in which a predetermined button on the control apparatus such as the remote control is selected, but this is merely an exemplary embodiment. The predetermined event may include diverse exemplary embodiments in which the instant-on mode may not continue such as when the display apparatus 100 gets unplugged.

More specifically, the remote control may include a separate button to turn on or off the instant-on mode. Accordingly, when an event in which the button on the remote control is pressed to turn off the instant-on mode occurs after the display apparatus 100 is turned off, the sub controller 142 may receive an IR signal of the button to turn off the instant-on mode. Consequently, the sub controller 142 may turn off the instant-on mode and change the output of the indicator.

For example, when the indicator is the LED provided on the interior of the display apparatus 100, the sub controller 142 may control the LED to change luminous color, change a flickering state to a non-flickering state, or increase a flickering rate.

When a first user command is input to turn on the display apparatus 100 after outputting the indicator indicating that the display apparatus 100 operates in the instant-on mode in the power-off state, the controller 140 may display image content corresponding to the stored image content information.

In addition, when a second user command is input to turn on the display apparatus 100, the controller 140 may control the display 110 to display a predetermined screen of the display apparatus 100 which is pre-stored.

More specifically, the first user command may be a user command of pressing a power button during less than a predetermined period of time, and the second user command may be a user command of pressing the power button during the predetermined period of time or more. The predetermined screen may be a pre-stored initial screen of the display apparatus 100.

In other words, even though the power is off in the instant-on mode, the controller 140 may turn on or off the instant-on mode according to a user command.

The image receiver 150 receives image data from diverse sources. For example, the image receiver 150 may receive broadcast data from an external broadcasting station, receive image data from an external server in real time, or receive image data stored in the storage 120.

The image processor 160 processes image data received by the image receiver 150. The image processor 160 performs diverse image processing for the image data such as decoding, scaling, noise filtering, frame rate conversion, and resolution conversion.

The audio processor 170 processes audio data. The audio processor 170 may perform diverse processing for audio data such as decoding, amplification, and noise filtering. The audio data processed by the audio processor 170 are output to the audio outputter 180.

The audio outputter 180 outputs diverse notification sounds and voice messages as well as diverse audio data processed by the audio processor 170. The audio outputter 180 may be implemented with a speaker, but this is merely an exemplary embodiment. The audio outputter 180 may also be implemented with an audio terminal.

The display apparatus 100 may include the communication module 190. The communication module 190 may include diverse types of communication modules such as a Bluetooth module 191 and a wireless fidelity (Wi-Fi) module 192. The Bluetooth Module 191 and the Wi-Fi module 192 may enable the display apparatus 100 to communicate with an external control apparatus.

The Bluetooth module 191 uses wireless transmission technology between the display apparatus 100 and an external electronic apparatus (for example, a mobile phone or a PC).

That is, the Bluetooth module 191 performs Bluetooth communication between the display apparatus 100 and an external control apparatus to control the display apparatus 100.

The Wi-Fi module 192 uses a local area network to use wireless internet using radio waves at a location where an access point (AP) is installed through the display apparatus 100.

As described above, the user may recognize whether the display apparatus 100 is in the instant-on mode in the power-off state. In addition, the user may easily control whether to perform instant booting.

Figure 3:
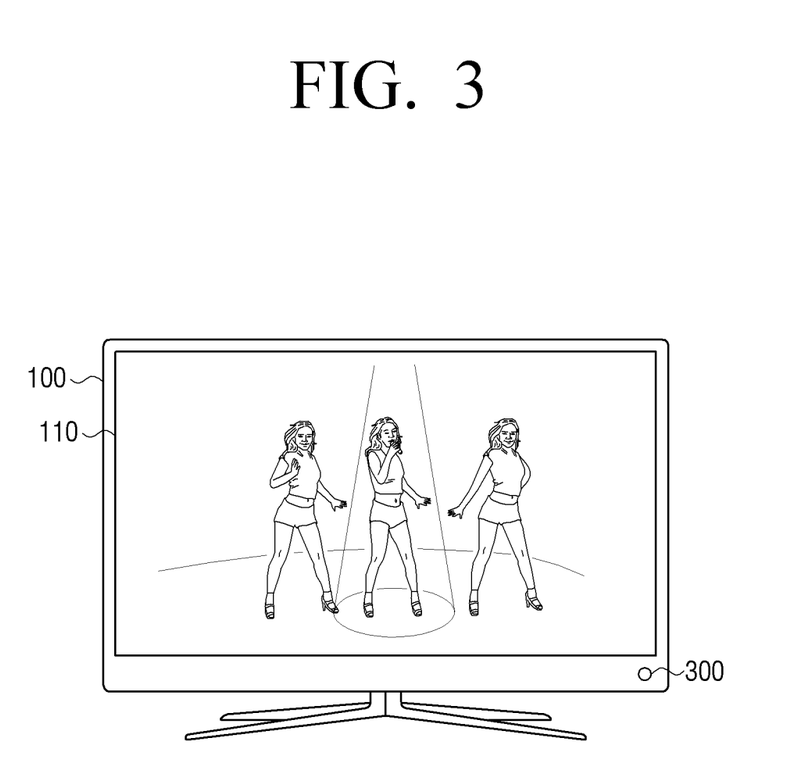
FIGS. 3 and 4 illustrate a luminous method of an LED of the display apparatus according to an exemplary embodiment.
Figure 4:
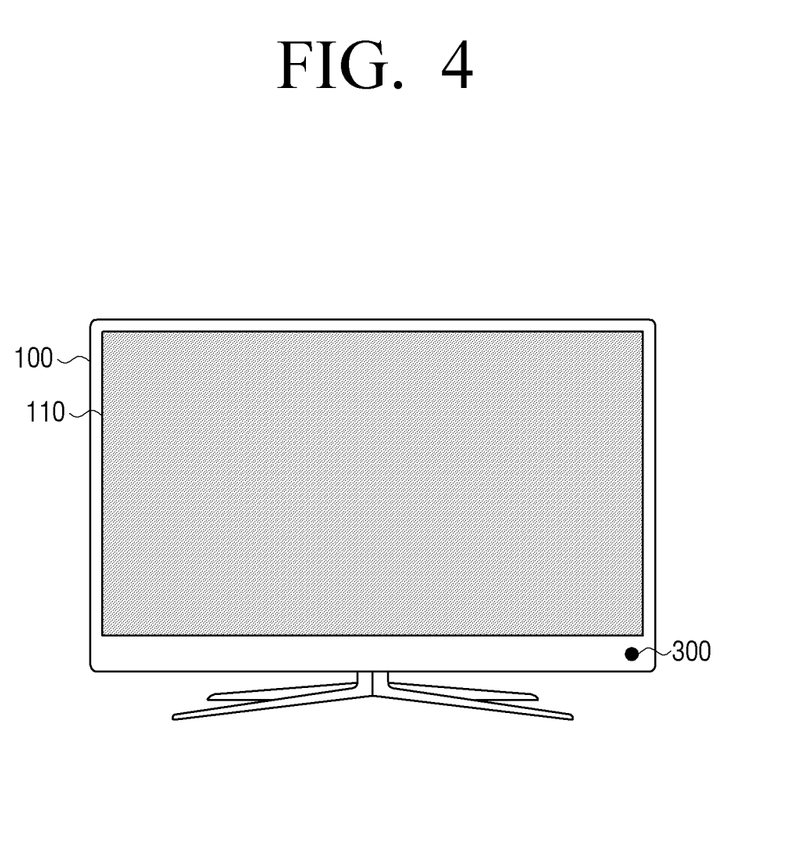

It is described how an LED glows as an indicator in greater detail with reference to FIGS. 3 and 4.

FIG. 3 illustrates the turned-on display apparatus 100. The display apparatus 100 may include an LED 300 on a portion of a bezel which surrounds the display 110. When the display apparatus 100 is turned on, the LED 300 may emit light in a predetermined color or may be turned off to prevent the TV screen from being disturbed.

The controller 140 may determine that the display apparatus 100 operates in the instant-on mode if an event which is predetermined in initial settings does not occur.

The predetermined event may include when the display apparatus 100 gets unplugged and is thus turned off, when the power-off command is input through the user inputter 130 and the display apparatus 100 is turned off after software updates, when the display apparatus 100 is turned on during more than a predetermined period of time, the power-off command is input while the display apparatus 100 is turned off, and when the display apparatus 100 is turned off before finishing automatic channel search (auto store or auto search).

Accordingly, when a power-off command is input, the controller 140 may determine that the display apparatus 100 operates in the instant-on mode if the aforementioned predetermined event does not occur.

When it is determined that the display apparatus 100 is in the instant-on mode, the controller 140 may control the storage 120 to store information regarding image content being displayed when the power-off command is input. In particular, in order to turn off the display apparatus 100 in standby mode such as suspend to RAM, the controller 140 may store in the storage 120 information regarding image content being displayed when a power-off command is input.

FIG. 4 shows that the display apparatus 100 is off in the instant-on mode. The controller 140 may change color of the LED 300 to notify the instant-on mode to the user.

For example, when the display apparatus 100 is turned on as shown in FIG. 3, the controller 140 controls the LED 300 to glow blue, and when the display apparatus 100 is turned off in the instant-on mode, the controller 140 controls the LED 300 to glow yellow.

When the aforementioned predetermined event occurs and thus the controller 140 determines that the display apparatus 100 is not in the instant-on mode, the controller 140 may control the LED 300 shown in FIG. 4 to flicker. Alternatively, the controller 140 may make color of the LED in the power-off state different from that in the instant-on mode.

For example, when the display apparatus 100 is turned on as shown in FIG. 3, the controller 140 controls the LED 300 to glow blue, when the display apparatus 100 is turned off in the instant-on mode, the controller 140 controls the LED 300 to glow yellow, and when the display apparatus 100 is turned off in non-instant-on mode, the controller 140 controls the LED 300 to glow green.

This light emission method of the LED 300 is merely an exemplary embodiment. When the display apparatus 100 is turned off in the instant-on mode and is turned off in non-instant-on mode, the controller 140 may control a luminous state of the LED 300 so that the LED 300 may flicker but change the number of flickering times or a flickering period in order to notify the user of the mode of the display apparatus 100.

Figure 5:
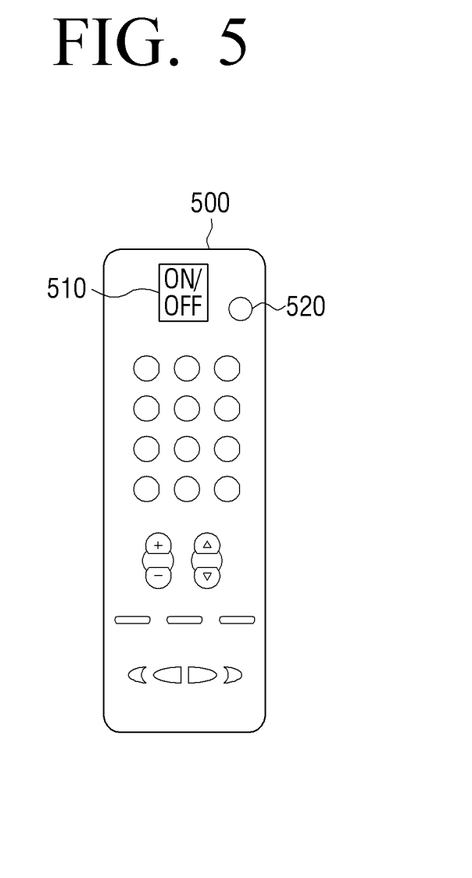
FIG. 5 illustrates a remote control to control the display apparatus according to an exemplary embodiment.

FIG. 5 illustrates a remote control 500 to control the display apparatus 100 according to an exemplary embodiment. In particular, the remote control 500 shown in FIG. 5 may include a button 520 to turn on or turn off the instant-on mode.

When the user presses the button 520 on the remote control 500 after the display apparatus 100 is turned off in the instant-on mode, the controller 140 may receive an IR signal of the button 520.

In particular, the controller 140 may include the sub controller 142. That is, since the power is supplied to the sub controller 142 regardless of whether the display apparatus 100 is turned on or turned off, the sub controller 142 may receive an IR signal of the remote control 500.

Accordingly, when the sub controller 142 receives the IR signal of the button 520, the controller 140 may turn off the instant-on mode. In addition, the controller 140 may change the output of the indicator.

For example, when the LED 300 on the bezel of the display apparatus 100 glows as the indicator, the controller 140 may make the LED 300 glowing yellow in the instant-on mode glow blue. Alternatively, the controller 140 may make non-flickering LED 300 flicker.

On the other hand, when a user command is input to turn on the display apparatus 100 after the display apparatus 100 is turned off in the instant-on mode, the controller 140 may turn on the display apparatus 100 in the instant-on mode or in non-instant-on mode.

For example, the controller 140 may determine that a user command of pressing an on/off button 510 on the remote control 500 during less than a predetermined period of time (for example, 1 second) is a user command to turn on the display apparatus 100 in the instant-on mode.

Accordingly, when a user command of pressing the on/off button 510 during less than the predetermined period of time (for example, 1 second) is input, the controller 140 may control the display 110 to display the stored image content being displayed when the power-off command was input.

On the other hand, when a user command of pressing the on/off button 510 during the predetermined period of time (for example, 1 second) or more is input, the controller 140 may control the display 110 to display the predetermined screen stored in the storage 120.

The predetermined screen may be a screen which is set to be initially displayed when the power is supplied to the display apparatus 100.

As in the above exemplary embodiment, even though the user does not unplug the display apparatus 100, the user may control booting mode of the display apparatus 100 by simple manipulation.

Determining booting mode of the display apparatus 100 according to the pressed time of the on/off button 510 is merely an exemplary embodiment. When the user presses the on/off button 510, the controller 140 may boot up the display apparatus 100 in the instant-on mode, and when the user presses a separate key on the remote control 500, the controller 140 may boot up the display apparatus 100 in non-instant-on mode (for example, cold booting).

Alternatively, when the user presses the on/off button 510 on the remote controller 500 once, the controller 140 the controller 140 may boot up the display apparatus 100 in the instant-on mode, and when the user presses the on/off button 510 twice quickly, the controller 140 may boot up the display apparatus 100 in non-instant-on mode (for example, cold booting).

After a power-off command is input to the display apparatus 100, the controller 140 may determine that the display apparatus 100 does not operate in the instant-on mode if a predetermined event occurs.

For example, the controller 140 may determine that the display apparatus 100 does not operate in the instant-on mode when the display apparatus 100 gets unplugged and is thus turned off, when the power-off command is input and the display apparatus 100 is turned off after software updates, when the power-off command is input after the display apparatus 100 is turned on during more than a predetermined period of time, or when the display apparatus 100 is turned off before finishing automatic channel search.

Figure 6:
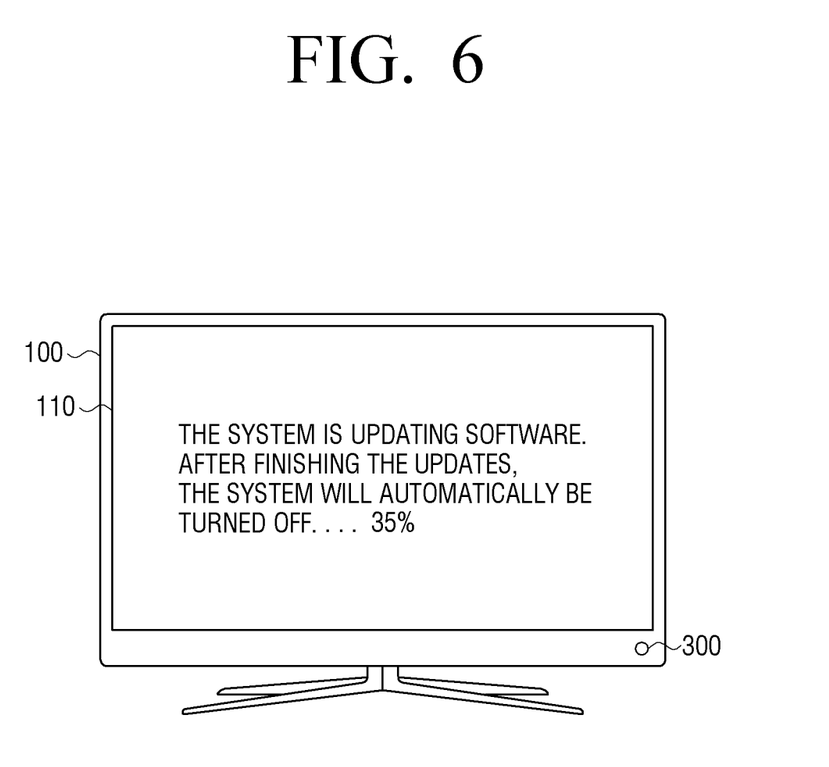
FIG. 6 illustrates a screen to update software on the display apparatus according to an exemplary embodiment.

That is, when a power-off command is input, and the display apparatus 100 is automatically turned off after software updates as shown in FIG. 6, the controller 140 may determine that the display apparatus 100 does not operate in the instant-on mode.

Figure 7:
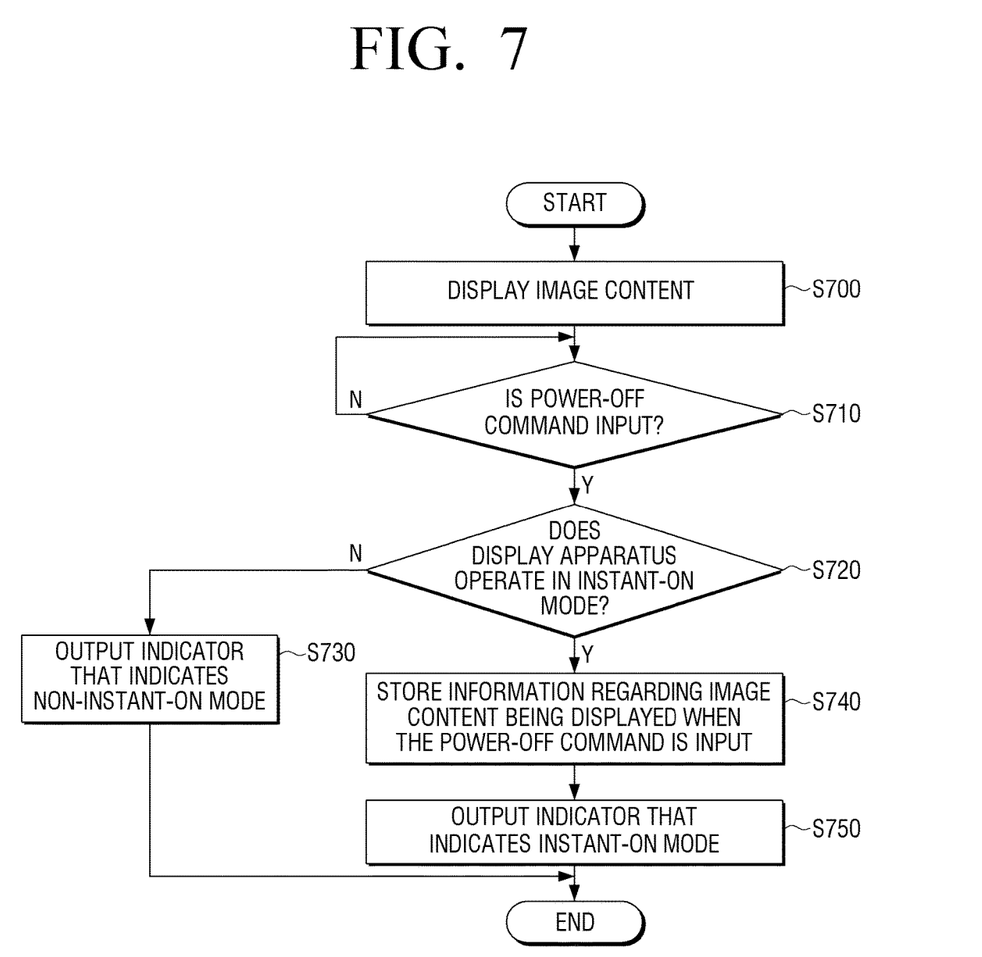
FIG. 7 is a flow chart of a method for outputting a different indicator according to booting mode of the display apparatus according to an exemplary embodiment.

FIG. 7 is a flow chart of a method for outputting a different indicator according to booting mode of the display apparatus 100.

The display apparatus 100 displays image content (S700), and determines whether a power-off command is input (S710).

When a power-off command is input (S710-Y), the display apparatus 100 determines whether the display apparatus 100 operates in the instant-on mode (S720). That is, it is determined that the display apparatus 100 operates in the instant-on mode if an event which is predetermined in initial settings does not occur.

The predetermined event may include when the display apparatus 100 gets unplugged and is thus turned off, when the power-off command is input through the user inputter 130 and the display apparatus 100 is turned off after software updates, when the display apparatus 100 is turned on during more than a predetermined period of time, the power-off command is input, and the display apparatus 100 is turned off, and when the display apparatus 100 is turned off before finishing automatic channel search.

That is, it is determined that the display apparatus 100 operates in the instant-on mode if the predetermined event does not occur.

When the display apparatus 100 operates in the instant-on mode (S720-Y), the display apparatus 100 stores information regarding image content being displayed when the power-off command is input (S740). In addition, the display apparatus 100 outputs an indicator that indicates the instant-on mode (S750).

On the other hand, when the display apparatus 100 does not operate in the instant-on mode (S720-N), the display apparatus 100 outputs an indicator that indicates non-instant-on mode (S730).

For example, the display apparatus 100 may control an output method of an LED as an indicator. That is, the display apparatus 100 may control an output method of the LED attached to the exterior of the display apparatus 100 so that an output method of the LED in the instant-on mode may be different from that in non-instant-on mode.

More specifically, the display apparatus 100 may control an output method of the LED using at least one of a color of the LED, whether the LED flickers, the number of flickering times of the LED, and a luminous period of the LED.

The display apparatus 100 outputs a different indicator according to booting mode as described above so that the user may easily recognize booting mode of the display apparatus 100.

Figure 8:
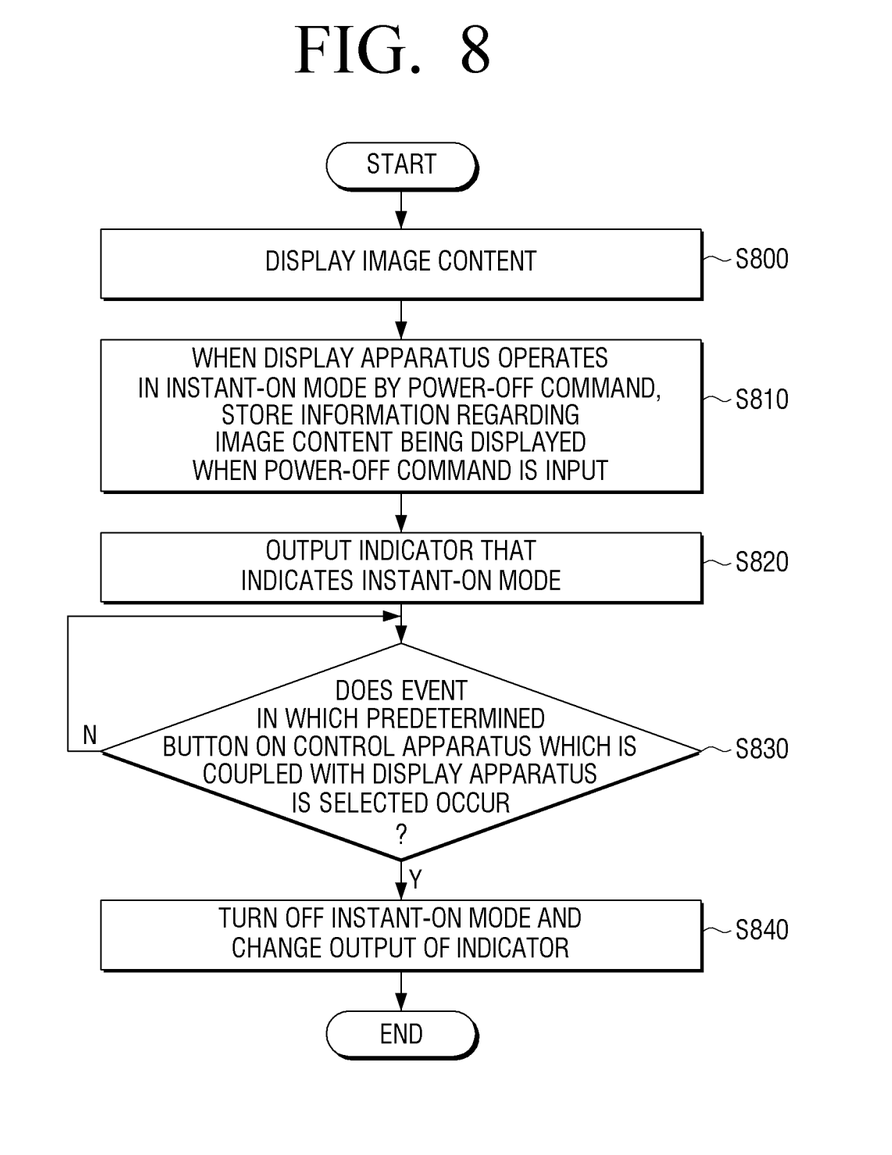
FIG. 8 is a flow chart of a method for changing booting mode of the display apparatus and the output of the indicator according to booting mode of the display apparatus according to an exemplary embodiment.

FIG. 8 is a flow chart of a method for changing booting mode of the display apparatus 100 and the output of the indicator according to the booting mode of the display apparatus 100 according to an exemplary embodiment.

The display apparatus 100 displays image content (S800). Subsequently, when the display apparatus 100 operates in the instant-on mode by a power-off command, the display apparatus 100 stores information regarding image content being displayed when the power-off command is input (S810).

That is, when the display apparatus 100 is turned off, the display apparatus 100 may store a state of a hardware drive in the storage 120 such as a DRAM so that standby mode such as suspend to RAM and suspend to disk or instant-on mode may run. Accordingly, in the suspend state, the display apparatus 100 may restore content stored in the storage 120 such as a DRAM using self-refresh operation of a double data rate (DDR) memory of the storage 120. When a power-on command is input to the display apparatus 100, the display apparatus 100 may be instantly restored to the operation state prior to power-off.

Subsequently, the display apparatus 100 outputs an indicator that indicates the instant-on mode (S820).

For example, the display apparatus 100 may control an output method of an LED as the indicator. That is, the display apparatus 100 may control an output method of an LED attached to the exterior of the display apparatus 100 so that an output method of the LED in the instant-on mode may be different from that in non-instant-on mode.

More specifically, the display apparatus 100 may control an output method of the LED using at least one of a color of the LED, whether the LED flickers, the number of flickering times of the LED, and a luminous period of the LED.

Subsequently, the display apparatus 100 determines whether an event in which a predetermined button on a control apparatus which is coupled with the display apparatus 100 is selected occurs (S830).

The control apparatus which is coupled with the display apparatus 100 may be a remote control. Accordingly, when an event in which a predetermined button on the remote control is selected occurs (S830-Y), the display apparatus 100 turns off the instant-on mode and changes the output of the indicator (S840).

When the LED glows as the indicator as described above, the display apparatus 100 may control the LED to glow yellow in the instant-on mode. When the event in which the predetermined button on the remote control is selected occurs, the display apparatus 100 may turn off the instant-on mode and control the LED to flicker or change the color.

By the aforementioned method for changing the output of the indicator, the user may change a booting mode regardless of whether the display apparatus 100 is turned on or off.

Figure 9:
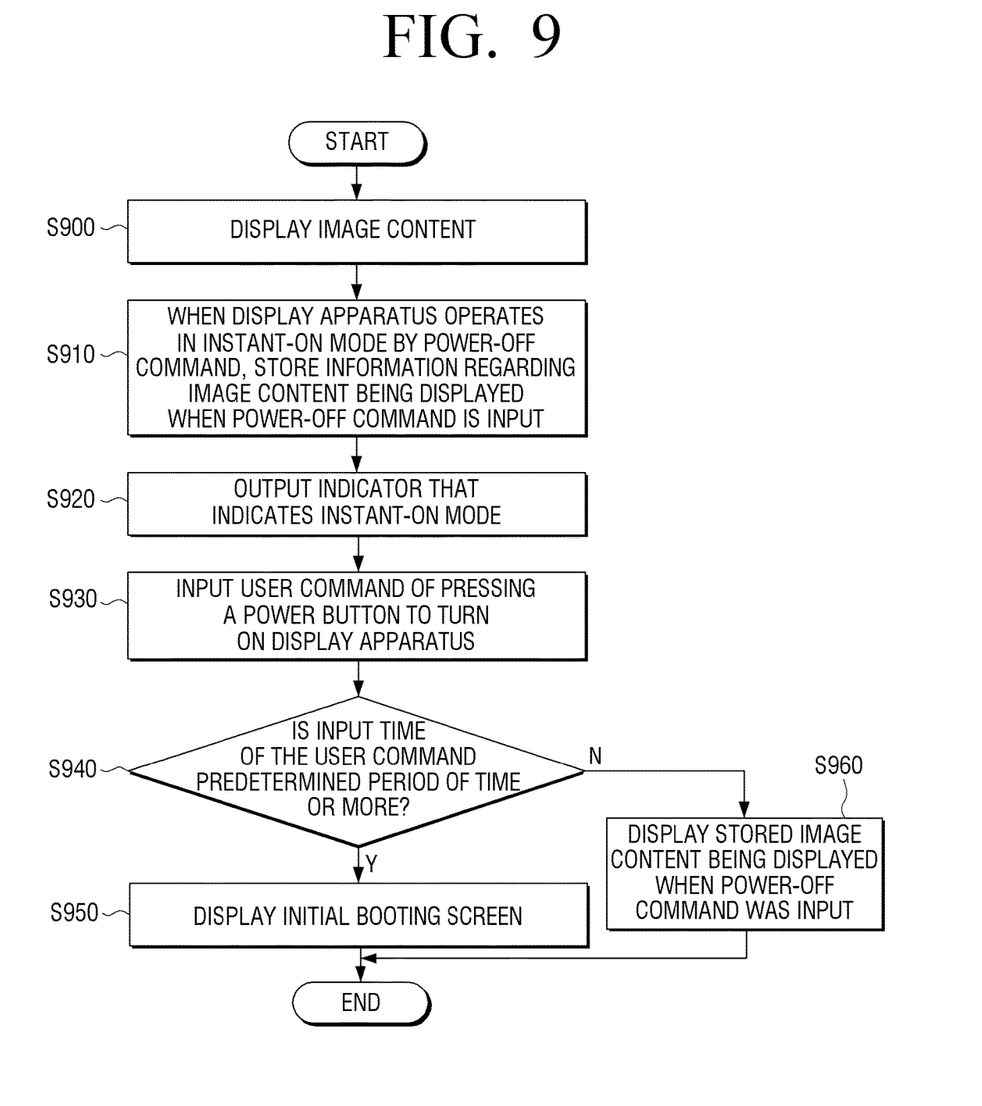
FIG. 9 is a flow chart of a method for controlling booting mode of the display apparatus according to an exemplary embodiment.

FIG. 9 is a flow chart of a method for controlling booting mode of the display apparatus 100 according to an exemplary embodiment.

The display apparatus 100 displays image content (S900). Subsequently, when the display apparatus 100 operates in the instant-on mode by a power-off command, the display apparatus 100 stores information regarding image content being displayed when the power-off command is input (S910).

That is, when the display apparatus 100 is turned off, the display apparatus 100 may store a state of a hardware drive in the storage 120 such as a DRAM so that standby mode such as suspend to RAM and suspend to disk or instant-on mode may run. Accordingly, in the suspend state, the display apparatus 100 may restore content stored in the storage 120 such as a DRAM using self-refresh operation of a double data rate (DDR) memory of the storage 120. In addition, when a power-on command is input to the display apparatus 100, the display apparatus 100 may be instantly restored to the operation state prior to power-off.

Subsequently, the display apparatus 100 outputs an indicator that indicates the instant-on mode (S920).

For example, the display apparatus 100 may control an output method of an LED as the indicator. That is, the display apparatus 100 may control an output method of an LED attached to the exterior of the display apparatus 100 so that an output method of the LED in the instant-on mode may be different from that in non-instant-on mode.

More specifically, the display apparatus 100 may control an output method of the LED using at least one of a color of the LED, whether the LED flickers, the number of flickering times of the LED, and a luminous period of the LED.

Subsequently, when a user command of pressing a power button is input to turn on the display apparatus 100 (S930), the display apparatus 100 determines whether an input time of the user command is a predetermined period of time or more (S940).

When the input time of the user command is the predetermined period of time or more (S940-Y), the display apparatus 100 displays an initial booting screen (S950). That is, the display apparatus 100 may pre-store a predetermined screen as the initial booting screen. Accordingly, when the input time of the user command is the predetermined period of time or more (S940-Y), the display apparatus 100 determines that booting is not performed in the instant-on mode, and thus displays the pre-stored screen.

When the input time of the user command is less than the predetermined period of time (S940-N), the display apparatus 100 displays the stored image content being displayed when the power-off command was input (S960). That is, the display apparatus 100 may perform instant booting.

For example, the display apparatus 100 may determine that a user command of pressing an on/off button on a remote control during less than a predetermined period of time (for example, 1 second) is a user command to turn on the display apparatus 100 in the instant-on mode.

Accordingly, when a user command of pressing the on/off button during less than the predetermined period of time (for example, 1 second) is input, the display apparatus 100 may display the stored image content being displayed when the power-off command was input (S940-N).

On the other hand, when a user command of pressing the on/off button during the predetermined period of time (for example, 1 second) or more is input, the display apparatus 100 may control the display 110 to display the pre-stored predetermined screen (S940-Y). The predetermined screen may be a screen which is set to be initially displayed when the power is supplied to the display apparatus 100.

According to one or more exemplary embodiments, the user may easily recognize and control the booting mode of the display apparatus.

The methods for controlling a booting mode of the display apparatus according to one or more exemplary embodiments may be coded as software and be stored in a non-transitory computer readable medium. The non-transitory computer readable medium may be mounted in diverse types of devices.

The non-transitory computer readable medium is a medium which does not store data temporarily such as a register, cash, and memory but stores data semi-permanently and is readable by devices. More specifically, the non-transitory computer readable media may be compact disks (CDs), digital video disks (DVDs), hard disks, Blu-ray disks, universal serial buses (USBs), memory cards, and read-only memory (ROM).

The foregoing exemplary embodiments and advantages are merely exemplary and are not to be construed as limiting the present invention. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A control method of a display apparatus comprising:
    displaying an image content;
    in response to a power-off command being input, determining whether the display apparatus operates in an instant-on mode;
    in response to the determining that the display apparatus operates in the instant-on mode, storing information regarding the image content displayed when the power-off command is input, and outputting an indicator that indicates the instant-on mode; and
    in response to a first user command being input to turn on the display apparatus while the indicator indicates that the display apparatus is operated in the instant-on mode in the power-off state, displaying image content corresponding to the stored information regarding the image content, and in response to a second user command being input to turn on the display apparatus, displaying a pre-stored predetermined screen of the display apparatus,
    wherein the first user command is a user command of pressing a power button of a control apparatus that is coupled with the display apparatus less than a predetermined period of time, and the second user command is a user command of pressing the power button longer than the predetermined period of time.

2. The control method as claimed in claim 1, wherein the outputting the indicator comprises differing an output method of a light emitting diode (LED) attached to an exterior of the display apparatus in the instant-on mode from the output method of the LED in a non-instant-on mode.

3. The control method as claimed in claim 2, wherein the differing the output method of the LED in the instant-on mode from the output method of the LED in the non-instant-on mode comprises differing at least one of a color of the LED, whether the LED flickers, a number of flickering times of the LED, a flickering pattern of the LED, and a luminous period of the LED.

4. The control method as claimed in claim 1, further comprising:
    determining whether a predetermined event occurs after the display apparatus is turned off in the instant-on mode; and
    in response to the predetermined event occurring, turning off the instant-on mode and changing an output of the indicator.

5. The control method as claimed in claim 4, wherein the predetermined event comprises a selection of a predetermined button on a control apparatus that is coupled with the display apparatus.

6. The control method as claimed in claim 1, wherein the determining comprises determining that the display apparatus does not operate in the instant-on mode in response to the display apparatus being unplugged, in response to the display apparatus being turned off in response to a software update, in response to the power-off command being input after the display apparatus is turned on for a predetermined period of time, or in response to the display apparatus being turned off before finishing an automatic channel search.

7. A display apparatus comprising:
    a display configured to display image content;
    a user inputter;
    a storage; and
    a controller configured to determine whether the display apparatus operates in an instant-on mode in response to a power-off command being input through the user inputter, control the storage to store information regarding image content being displayed in response to determining that the display apparatus operates in the instant-on mode when the power-off command is input, and control an indicator to indicate that display apparatus operates in the instant-on mode when the display apparatus operates in the instant-on mode,
    wherein in response to a first user command being input to turn on the display apparatus while the indicator indicates that the display apparatus operates in the instant-on mode, the controller is further configured to control the display to display image content corresponding to the stored information regarding the image content, and in response to a second user command being input to turn on the display apparatus, the controller is further configured to control the display to display a pre-stored predetermined screen of the display apparatus,
    wherein the first user command is a user command of pressing a power button of a control apparatus that is coupled with the display apparatus less than a predetermined period of time, and the second user command is a user command of pressing the power button longer than the predetermined period of time.

8. The display apparatus as claimed in claim 7, wherein the controller is further configured to control an output method of a light emitting diode (LED) attached to an exterior of the display apparatus in the instant-on mode to be different from the output method of the LED in a non-instant-on mode.

9. The display apparatus as claimed in claim 8, wherein the controller is further configured to control the output method of the LED to be different in the instant-on mode from the output method of the LED in the non-instant-on mode using at least one of a color of the LED, whether the LED flickers, a number of flickering times of the LED, a flickering pattern of the LED, and a luminous period of the LED.

10. The display apparatus as claimed in claim 7, wherein the controller comprises a sub controller, and
    the sub controller is configured to determine whether a predetermined event occurs after the display apparatus is turned off in the instant-on mode, and in response to the predetermined event being determined to have occurred, turn off the instant-on mode and change an output of the indicator.

11. The display apparatus as claimed in claim 10, wherein the predetermined event comprises a selection of a predetermined button on a control apparatus coupled with the display apparatus.

12. The display apparatus as claimed in claim 7, wherein the controller is further configured to determine that the display apparatus does not operate in the instant-on mode in response to the display apparatus being unplugged and, in response to the display apparatus being turned off in response to a software update, in response to the power-off command being input after the display apparatus is turned on for a predetermined period of time, or in response to the display apparatus being turned off before finishing an automatic channel search.

13. A method of controlling a power-on mode of a display apparatus, the method comprising:
in response to receiving a power-off command, determining whether the display apparatus operates in an instant-on mode;
in response to the determining that the display apparatus operates in the instant-on mode, storing information regarding image content displayed when the power-off command is received;
indicating that the display apparatus operates in an instant-on mode; and
while the display apparatus operates in the instant-on mode in a power-off state, in response to receiving a first user command, displaying image content corresponding to the stored information regarding the image content, and, in response to receiving a second user command, displaying a predetermined screen of the display apparatus,
wherein the first user command is a user command of pressing a power button of a control apparatus that is coupled with the display apparatus less than a predetermined period of time, and the second user command is a user command of pressing the power button longer than the predetermined period of time.

14. The method as claimed in claim 13, further comprising:
controlling the display apparatus to be in a non-instant-on mode in response to a predetermined event; and
in response to the predetermined event, indicating that the display device operates in the non-instant-on mode.

15. The method as claimed in claim 14, wherein the predetermined event is a user input.

* * * * *